3,314,836
METHOD COMPRISING MIXING A WAX, KEROSENE OR NAPTHA AND PHOSPHORUS
Alfred Lachs, 1760 Clay Ave., Bronx, N.Y. 10457
No Drawing. Filed Dec. 14, 1965, Ser. No. 513,857
7 Claims. (Cl. 149—29)

This invention relates to inflammable compositions and is particularly concerned with the dispersion of yellow phosphorus in colloidal form in an inflammable medium.

In modern warfare there is still a great need for improved conventional weapons. The use of flame throwers may be necessary under conditions where sophisticated weapons cannot be employed. The usual means for producing flame under modern conditions of warfare is by the use of napalm. Napalm is conventionally dispersed from an airplane thus restricting its employment to circumstances where air support is available and may be utilised.

An object of the present invention is to provide a flame effect which may be employed by infantry independently of an airplane.

A further object of the present invention is to provide a flame effect which may be produced by an artillery shell or an infantry mine.

Another object of the present invention is to make use of the combustible properties of yellow phosphorus.

Yet another object of the present invention is to provide a process of preparing an inflammable composition including yellow phosphorus dissolved in carbon disulfide.

These and other objects of the present invention will more fully appear from the detailed description of the invention which follows.

One of the characteristics of yellow phosphorus is that it will dissolve easily and in great amount in carbon disulfide. This solvent will readily dissolve eighteen times its own weight of yellow phosphorus.

Broadly the composition of the present invention comprises yellow phosphorus dissolved in carbon disulfide, an inflammable medium and a waxy or solid carrier in which the other ingredients are dispersed.

The process of the present invention broadly includes melting the solid or waxy carrier and combining the inflammable medium and the solution of yellow phosphorus therewith.

Suitable inflammable media are kerosene or naptha or other inflammable substances. However, there is no particular limitation on such materials provided that they will ignite easily upon combustion of yellow phosphorus and will give a suitable flame effect.

As dispersant carrier, or binder for the composition there may be employed rosin, a microcrystalline wax such as ozokerite or paraffin wax or a combination of these materials. An adhesive or binding material such as a rubber cement may also be usefully included in the composition.

Wide variations in the proportions of ingredients are permissible. Thus there may be 3 to 18 parts by weight of the phosphorus solution (3 parts of phosphorus in 1 part of carbon disulfide), 1 to 10 parts of the inflammable medium and 9 to 60 parts by weight of the carrier. A preferred composition includes 4 to 10 parts of rosin, 2 to 10 parts of ozokerite and 3 to 40 parts of paraffin wax. A solution of rubber cement in naphtha, when included, may range from 5 to 30 parts by weight.

In carrying out the process of the present invention it is preferred to melt the rosin and other ingredients of the carrier such as waxes, add the inflammable medium, cool the mixture and add the phosphorus solution. In manufacture on a large scale, the operation should be carried out in a closed unit in the presence of a stream of inert gas such as nitrogen or carbon dioxide. On a small scale the process may be effected in a jacketed kettle.

The invention is illustrated by the following example.

*Example*

| | Parts by weight |
|---|---|
| Rosin | 4 |
| Ozokerite | 2 |
| Paraffin (48° C.) | 5 |
| Kerosene or naptha | 3 |
| Rubber cement in naptha | 1.5 |
| Yellow phosphorus solution in carbon disulfide (3 parts phosphorus in 1 part carbon disulfide) | 5 |

The rosin and the waxes are melted and the kerosene added with stirring. This is allowed to cool to 60° C. and the rubber cement added. The mixture is further cooled to 50° C. with stirring being maintained. Finally the phosphorus solution is added with vigorous stirring until a yellowish white paste is formed. The operation is protected from air by being conducted in a heatable closed unit in which air can be replaced by an inert gas like carbon dioxide.

I claim:
1. A method of preparing an inflammable composition comprising melting a solid carrier selected from the group consisting of rosin, ozokerite and paraffin, and mixing an inflammable medium selected from the group consisting of kerosene and naptha and a solution of yellow phosphorus in carbon disulfide therewith.
2. The method as claimed in claim 1, wherein the inflammable medium is kerosene.
3. The method as claimed in claim 1, wherein the carrier consists of rosin.
4. The method as claimed in claim 1, wherein the carrier comprises 4 to 10 parts of rosin, 2 to 10 parts of ozokerite and 3 to 40 parts of paraffin wax.
5. The method as claimed in claim 1, wherein the inflammable medium is naptha.
6. The method as claimed in claim 1, wherein the carrier consists of ozokerite.
7. The method as claimed in claim 1, wherein the carrier is paraffin wax.

References Cited by the Examiner

UNITED STATES PATENTS

| 2,733,217 | 1/1956 | Woyski et al. | 149—29 X |
| 2,798,799 | 7/1957 | Woyski et al. | 252—305 X |

OTHER REFERENCES

The Condensed Chemical Dictionary, 5th ed., 1956, 1956, p. 860.

CARL D. QUARFORTH, *Primary Examiner.*

L. DEWAYNE RUTLEDGE, *Examiner.*

L. A. SEBASTIAN, *Assistant Examiner.*